(12) United States Patent
Kang

(10) Patent No.: US 12,026,354 B2
(45) Date of Patent: Jul. 2, 2024

(54) VIDEO GENERATION

(71) Applicant: Tencent Technology (Shenzhen) Company Limited, Guangdong (CN)

(72) Inventor: Hongwen Kang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/140,296

(22) Filed: Apr. 27, 2023

(65) Prior Publication Data

US 2023/0259253 A1 Aug. 17, 2023

Related U.S. Application Data

(63) Continuation of application No. PCT/CN2022/112842, filed on Aug. 16, 2022.

(30) Foreign Application Priority Data

Aug. 31, 2021 (CN) .......................... 202111013239.9

(51) Int. Cl.
  *G06F 3/048* (2013.01)
  *G06F 3/0482* (2013.01)
  (Continued)

(52) U.S. Cl.
  CPC ............ *G06F 3/0482* (2013.01); *G06F 3/167* (2013.01)

(58) Field of Classification Search
  CPC ...... G06F 3/0482; G06F 16/783; G06F 3/167; H04N 21/439; H04N 21/44
  See application file for complete search history.

(56) References Cited

U.S. PATENT DOCUMENTS 5,835,087 A * 11/1998 Herz .................. H04N 21/2223
  348/E7.071
6,327,590 B1 * 12/2001 Chidlovskii ........ G06F 16/9535
  707/999.005

(Continued)

FOREIGN PATENT DOCUMENTS

CN  105868176 A  8/2016
CN  110121116 A  8/2019

(Continued)

OTHER PUBLICATIONS

International Search Report in PCT/CN2022/112842, mailed Oct. 17, 2022, 5 pages.

(Continued)

*Primary Examiner* — Nicholas Augustine
(74) *Attorney, Agent, or Firm* — ArentFox Schiff LLP

(57) ABSTRACT

Some aspects of the disclosure provide a method for video generation. The method includes displaying, in response to an audio input operation in an audio input interface provided by a terminal device, a keyword selection interface based on a first audio that is obtained from the audio input operation. The keyword selection interface includes at least a recommended keyword that is obtained by performing a speech recognition on the first audio. The method further includes determining, in response to an editing operation on the at least the recommended keyword in the keyword selection interface, at least a target keyword, and displaying, in response to a video synthesis operation in the keyword selection interface, a video display interface, the video display interface includes a synthetic video from a video clip, and the video clip matches the target keyword.

20 Claims, 10 Drawing Sheets

(51) Int. Cl.
*G06F 3/16* (2006.01)
*G06F 3/01* (2006.01)

(56) References Cited

U.S. PATENT DOCUMENTS

| | | | | |
|---|---|---|---|---|
| 6,385,602 | B1* | 5/2002 | Tso | G06F 16/338 |
| 6,901,207 | B1* | 5/2005 | Watkins | H04N 7/163 |
| | | | | 386/E5.064 |
| 6,963,867 | B2* | 11/2005 | Ford | G06Q 30/02 |
| | | | | 707/769 |
| 7,209,942 | B1* | 4/2007 | Hori | G06F 16/437 |
| | | | | 725/139 |
| 10,362,360 | B2* | 7/2019 | Gossweiler | H04N 21/8193 |
| 10,938,984 | B2* | 3/2021 | Kats | H04M 19/041 |
| 10,944,863 | B2* | 3/2021 | Kats | H04M 1/2757 |
| 10,979,558 | B2* | 4/2021 | Kats | H04M 19/04 |
| 11,005,990 | B2* | 5/2021 | Kats | H04M 1/576 |
| 11,381,679 | B2* | 7/2022 | Kats | H04M 3/42042 |
| 11,601,719 | B2* | 3/2023 | Gao | H04N 21/4312 |
| 2002/0069218 | A1* | 6/2002 | Sull | G11B 27/105 |
| | | | | 715/201 |
| 2004/0220926 | A1* | 11/2004 | Lamkin | G11B 27/105 |
| 2007/0143778 | A1* | 6/2007 | Covell | H04N 21/8133 |
| | | | | 725/135 |
| 2008/0155627 | A1* | 6/2008 | O'Connor | H04N 21/84 |
| | | | | 348/E7.069 |
| 2017/0318347 | A1* | 11/2017 | Abecassis | H04N 21/47217 |
| 2019/0034976 | A1* | 1/2019 | Hamedi | G06Q 30/0243 |
| 2020/0034357 | A1* | 1/2020 | Panuganty | G06F 16/24578 |
| 2021/0086089 | A1* | 3/2021 | Pardeshi | G06N 3/02 |
| 2021/0264900 | A1* | 8/2021 | Reece | G06F 3/167 |
| 2022/0179665 | A1* | 6/2022 | Rathod | G06F 9/451 |

FOREIGN PATENT DOCUMENTS

| | | |
|---|---|---|
| CN | 112752121 A | 5/2021 |
| CN | 114286169 A | 4/2022 |

OTHER PUBLICATIONS

Office Action in CN202111013239.9, mailed Mar. 15, 2023, 29 pages.

Written Opinion in PCT/CN2022/112842, mailed Oct. 17, 2022, 6 pages.

* cited by examiner

VIDEO GENERATION

RELATED APPLICATIONS

The present application is a continuation of International Application No. PCT/CN2022/112842, entitled "VIDEO GENERATION METHOD AND APPARATUS, TERMINAL, SERVER AND STORAGE MEDIUM" and filed on Aug. 16, 2022, which claims priority to Chinese Patent Application No. 202111013239.9, entitled "VIDEO GENERATION METHOD AND APPARATUS, TERMINAL, SERVER AND STORAGE MEDIUM" and filed on Aug. 31, 2021. The entire disclosures of the prior applications are hereby incorporated by reference in their entirety.

FIELD OF THE TECHNOLOGY

Embodiments of this disclosure relate to the field of video processing technologies, including a video generation method and apparatus, a terminal, a server and a storage medium.

BACKGROUND OF THE DISCLOSURE

With the development of Internet technology, creators attract traffic and attention by publishing audio and video on a platform.

In related technologies, if audio and video to be published need to be generated, the audio and video to be published may be obtained by manually recording audio and video, and then cutting and editing the recorded audio and video, or the audio and video to be published may be generated by collecting existing video materials, and performing editing and splicing.

For the generation of audio and video that requires manual participation, the video generation efficiency is low, and the timeliness of video publishing is affected.

SUMMARY

Embodiments of this disclosure provide a video generation method and apparatus, a terminal, a server and a storage medium (e.g., non-transitory computer-readable storage medium).

Some aspects of the disclosure provide a method for video generation. The method includes displaying, in response to an audio input operation in an audio input interface provided by a terminal device, a keyword selection interface based on a first audio that is obtained from the audio input operation. The keyword selection interface includes at least a recommended keyword that is obtained by performing a speech recognition on the first audio. The method further includes determining, in response to an editing operation on the at least the recommended keyword in the keyword selection interface, at least a target keyword, and displaying, in response to a video synthesis operation in the keyword selection interface, a video display interface, the video display interface includes a synthetic video from a video clip matching the target keyword.

Some aspects of the disclosure provide a method for video generation that includes performing, by a server device, a speech recognition on a first audio to determine at least a recommended keyword in response to a receipt of the first audio. Further, the method includes performing, in response to a video synthesis request, a video clip matching based on at least a target keyword to obtain at least one video clip. The at least the target keyword is determined based on the at least the recommended keyword. The method also includes generating a synthetic video based on the at least one video clip.

Some aspects provide an apparatus for video generation. The apparatus includes processing circuitry configured to display, in response to an audio input operation in an audio input interface, a keyword selection interface based on a first audio that is obtained from the audio input operation. The keyword selection interface includes at least a recommended keyword that is obtained by performing a speech recognition on the first audio. The processing circuitry is further configured to determine, in response to an editing operation on the at least the recommended keyword in the keyword selection interface, at least a target keyword and display, in response to a video synthesis operation in the keyword selection interface, a video display interface. The video display interface includes a synthetic video from a video clip, and the video clip matching the target keyword.

By performing speech recognition on an audio input by a user, determining a recommended keyword, then performing video clip matching based on the recommended keyword, and generating a synthetic video based on the matching video clip, conversion from the audio to a related video is realized. In a video generation scene, a user may obtain a speech-related video by inputting a piece of speech, so that the video generation efficiency is improved, and then the video publishing efficiency is improved. Also provided is a keyword selection interface, so that a user may manually adjust a recommended keyword, thus making a generated video more in line with the user's needs.

DESCRIPTION OF EMBODIMENTS

To make the objectives, technical solutions, and advantages of this disclosure clearer, the following further describes implementations of this disclosure in further detail with reference to the accompanying drawings.

Figure 1:
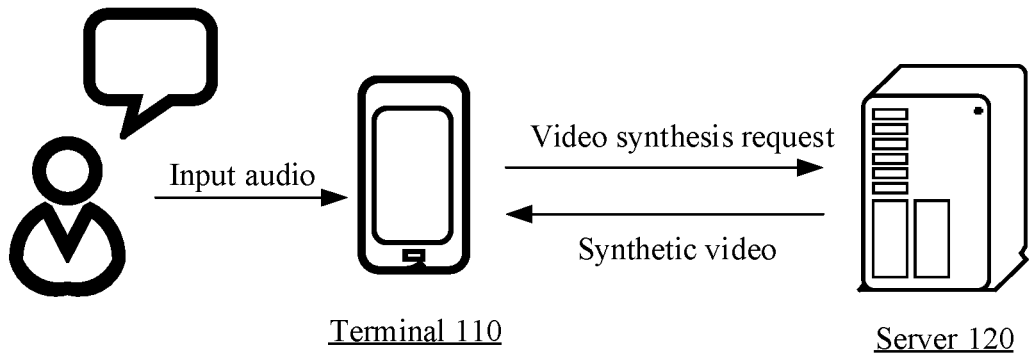
FIG. 1 is a schematic diagram of an implementation environment shown in an exemplary embodiment of this disclosure.

An embodiment of this disclosure provides an audio-to-video conversion method. FIG. 1 is a schematic diagram of an implementation environment shown in an exemplary embodiment of this disclosure. The implementation environment includes: a terminal 110 and a server 120.

The terminal 110 is a device running a video application program. The video application program may be: a video editing application program, a video publishing application program and a video playback application program, etc. In the embodiment of this disclosure, the video application program run by the terminal 110 provides an audio-to-video conversion function. After a user inputs an audio, the terminal 110 obtains a recommended keyword based on the audio, and the user selects a target keyword for video synthesis, and initiates a video synthesis request to the server 120. In some examples, the terminal 110 may also upload the audio to the server 120, and the server 120 feeds an extracted recommended keyword back to the terminal 110.

In some examples, the terminal 110 includes, but is not limited to, a smart phone, a computer, an intelligent speech interaction device, an intelligent home appliance and a vehicle-mounted terminal, etc.

The terminal 110 is directly or indirectly connected with the server 120 through wired or wireless communication.

The server 120 is a cloud computing resource pool in the field of cloud technology, and various types of virtual resources are deployed in the resource pool for external customers to choose and use. The cloud computing resource pool mainly includes: a computing device (a virtualized machine, including an operating system), a storage device and a network device. The server may be an independent physical server, may also be a server cluster or a distributed system composed of a plurality of physical servers, and may further be a cloud server that provides basic cloud computing services such as cloud services, cloud databases, cloud computing, cloud functions, cloud storage, network services, cloud communication, middleware services, domain name services, security services, Content Delivery Networks (CDNs), big data and artificial intelligence platforms. In the embodiment of this disclosure, the server 120 may be a backend server of the video application program, which receives the video synthesis request transmitted by the terminal 110, obtains a video clip by matching based on the target keyword included in the video synthesis request, then obtains a synthetic video by synthesis based on the video clip, and feeds the synthetic video back to the terminal 110. In some examples, the server 120 may also receive the audio transmitted by the terminal 110, perform speech recognition on the audio, determine the recommended keyword, and feed the determined recommended keyword back to the terminal 110, so that the user may select the target keyword based on the recommended keyword.

In another possible implementation, the video clip and the video synthesis may also be performed by the terminal 110. For example, the terminal 110 is provided with a video material library, and the terminal 110 selects a matching video clip from the video material library according to a keyword, and performs the video synthesis according to the video clip to obtain a synthetic video. The video clip in the video material library is provided with a video tag, so that the terminal 110 performs video clip matching with the keyword based on the video tag.

The following embodiments make schematic description by taking only the video clip selection and synthesis steps being executed by the server 120 as an example, which is not limited herein.

Figure 2:
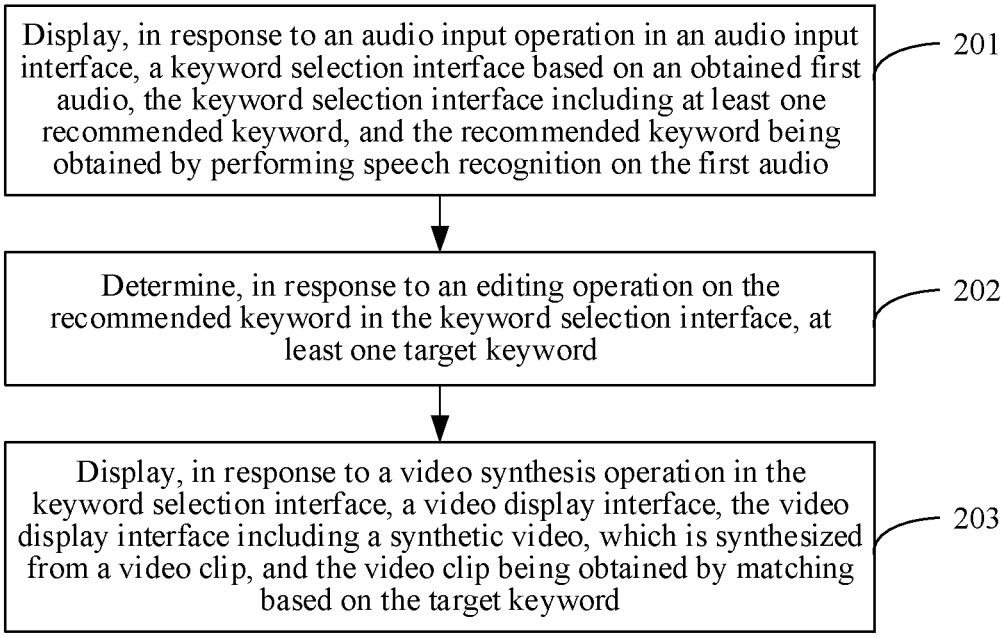
FIG. 2 is a flowchart of a video generation method provided by an exemplary embodiment of this disclosure.

FIG. 2 is a flowchart of a video generation method provided by an exemplary embodiment of this disclosure. The embodiment of this disclosure takes the application of the method to the terminal shown in FIG. 1 as an example, and the method includes the following steps:

In step 201, in response to an audio input operation in an audio input interface, a keyword selection interface is displayed based on an obtained first audio, the keyword selection interface includes at least one recommended keyword, and the recommended keyword is obtained by performing speech recognition on the first audio.

To improve the video generation efficiency, there is no need to record and edit a video manually. The embodiment of this disclosure provides a mode for automatically generating a related video directly based on an audio input by a user. In one possible implementation, the terminal is provided with an audio input interface. A user inputs a first audio to be converted into a video on the audio input interface, and the terminal receives an audio input operation in the audio input interface to obtain the first audio for performing a subsequent audio-to-video conversion process.

In some examples, the audio-to-video conversion function may be integrated into a specific function in the video application program. For example, in a video editing application program (a video editing platform), a user clicks an audio-to-video conversion control, enters the audio input interface and inputs an audio that needs to be converted into a related video.

In some examples, an audio recording control may be displayed in the audio input interface. A user clicks on the audio recording control, and the terminal receives a trigger operation for the audio recording control, collects a sound signal through a microphone, and determines the collected sound signal as the first audio.

In some examples, a file upload control may also be displayed in the audio input interface. A user clicks on the file upload control, and the terminal receives a trigger operation for the file upload control, and displays an audio file selection list, from which the user may select to upload a specified audio file (which may be a local audio file) from the list as the first audio.

In order to implement the audio-to-video conversion function, in one possible implementation, the terminal may perform speech recognition on the obtained first audio to obtain a first text content corresponding to the first audio, then perform keyword extraction on the first text content to obtain a recommended keyword used for generating a subsequent video, and display the recommended keyword in the keyword selection interface, so that the user confirms whether the recommended keyword meets the user's requirement or whether the recommended keyword is recognized accurately.

Figure 3:
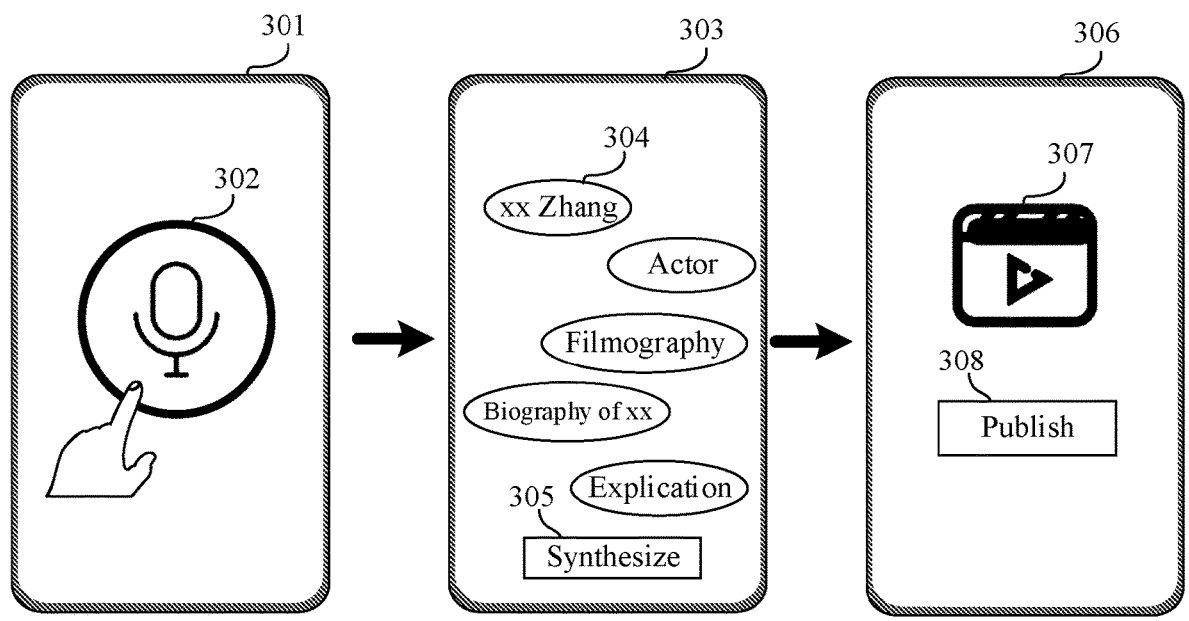
FIG. 3 is a schematic diagram of a video generation process shown in an exemplary embodiment of this disclosure.

FIG. 3 is a schematic diagram of a video generation process shown in an exemplary embodiment of this disclosure. An audio recording control 302 is displayed in an audio input interface 301. After a user clicks on the audio recording control 302, the terminal receives an audio input operation for the audio input interface 301 to obtain a first audio. After a recommended keyword is determined based on the first audio, a keyword selection interface 303 is displayed, and a plurality of recommended keywords 304 are displayed in the keyword selection interface 303.

In order to reduce power consumption of the terminal, in another possible implementation, the server may also perform a recommended keyword obtaining process, that is, after obtaining the first audio, the terminal uploads the first audio to the server, and the server performs speech recognition on the first audio to obtain at least one recommended keyword, and feeds the obtained recommended keyword back to the terminal, so that the terminal displays the recommended keyword in the keyword selection interface.

In some examples, the recommended keyword may be extracted from the first audio, that is, only the recommended keyword included in the first audio is displayed in the keyword selection interface.

In order to enrich the quantity of recommended keywords and then facilitate the subsequent generation of more informative synthetic videos, in one possible implementation, after a candidate keyword is extracted from the text content corresponding to the first audio, association recommendation is performed based on the candidate keyword, that is, a hot word related to the candidate keyword is obtained, and the hot word and the candidate keyword are used as the recommended keywords together.

In step 202, in response to an editing operation on the recommended keyword in the keyword selection interface, at least one target keyword is determined.

Because there may be errors in speech recognition, or the user may have inaccurate audio recording, the recommended keyword may not meet the user's expectation. In one possible implementation, the keyword selection interface is provided with an editing function for recommended keywords, and the user may manually modify a wrongly recognized recommended keyword, delete a redundant recommended keyword, and add a new recommended keyword, etc. After the user finishes the modification, the terminal determines the recommended keyword finally displayed in the keyword selection interface as a target keyword.

In step 203, in response to a video synthesis operation in the keyword selection interface, a video display interface is displayed, the video display interface includes a synthetic video, which is synthesized from a video clip, and the video clip is obtained by matching based on the target keyword.

In one possible implementation, after editing the recommended keyword in the keyword selection interface, the user clicks on a video synthesis control in the keyword selection interface, and the terminal receives the video synthesis operation in the keyword selection interface, and displays the video display interface, which displays the synthetic video.

As shown in FIG. 3, after the user edits the recommended keyword in the keyword selection interface 303, the user clicks on a synthesis control 305, and the terminal receives the video synthesis operation in the keyword selection interface, performs the subsequent video synthesis operation, and displays a synthetic video 307 in a video display interface 306. In some examples, the video display interface 306 may also include a publish control 308. When the user clicks on a publish control 308, the terminal receives a publish operation for the synthetic video 307, and publishes the synthetic video 307 to a display platform.

According to the synthetic video generation mode, video clip matching is performed based on the target keyword to obtain a hot video clip that matches the target keyword, and then the synthetic video that matches the target keyword is synthesized based on the video clip.

In some examples, the cases of synthesizing a video based on a video clip include the following: when the number of the target keyword is one, one matching video clip is obtained, and a synthetic video may be generated based on the video clip, a subtitle and dubbing. In some examples, when the number of the target keywords is two or more, a plurality of matching video clips are obtained, and a synthetic video is obtained by splicing and combining the plurality of video clips, and dubbing and a subtitle in the synthetic video may adopt an original subtitle and original dubbing in the original video clips. Or, the subtitle and the dubbing are both regenerated based on the target keywords.

In some examples, the subtitle included in the synthetic video may be generated from the target keyword and the first text corresponding to the first audio, and the dubbing is an audio stream obtained by speech synthesis based on the subtitle, and then the video is rendered based on the subtitle, the audio stream and the video to obtain the synthetic video finally displayed in the video display interface. In some embodiments, the dubbing is synthesized based on a timbre of the first audio, or the dubbing is synthesized based on a default timbre.

In some examples, a process of generating the synthetic video is executed by the server, the terminal transmits the target keyword to the server, and the server performs matching based on the received target keyword to obtain the video clip, generates the synthetic video based on the video clip, and feeds back the synthetic video to the terminal. The terminal displays the received synthetic video in the video display interface.

In summary, in the embodiment of this disclosure, by performing speech recognition on an audio to obtain a recommended keyword, then performing video clip matching based on the recommended keyword, and performing video synthesis based on the matching video clip, conversion from the audio to a related video is realized. In a video generation scene, a user may obtain a speech-related video by inputting a piece of speech, so that the video generation efficiency is improved, and then the video publishing efficiency is improved. Also provided is a keyword selection interface, so that a user may manually adjust a recommended keyword, thus making a generated video more in line with the user's needs.

To improve the accuracy of video synthesis based on a recommended keyword, and avoid an error in recommended keywords caused by an error in speech recognition, or a situation that a user needs to repeatedly input an audio due to an error in the audio input by the user (such as nonstandard pronunciation), in one possible implementation, the terminal displays the recommended keyword in the keyword selection interface, and provides the editing function of the keyword selection interface, so that the user may manually modify the recommended keyword, thereby improving the accuracy of the subsequent video synthesis.

Figure 4:
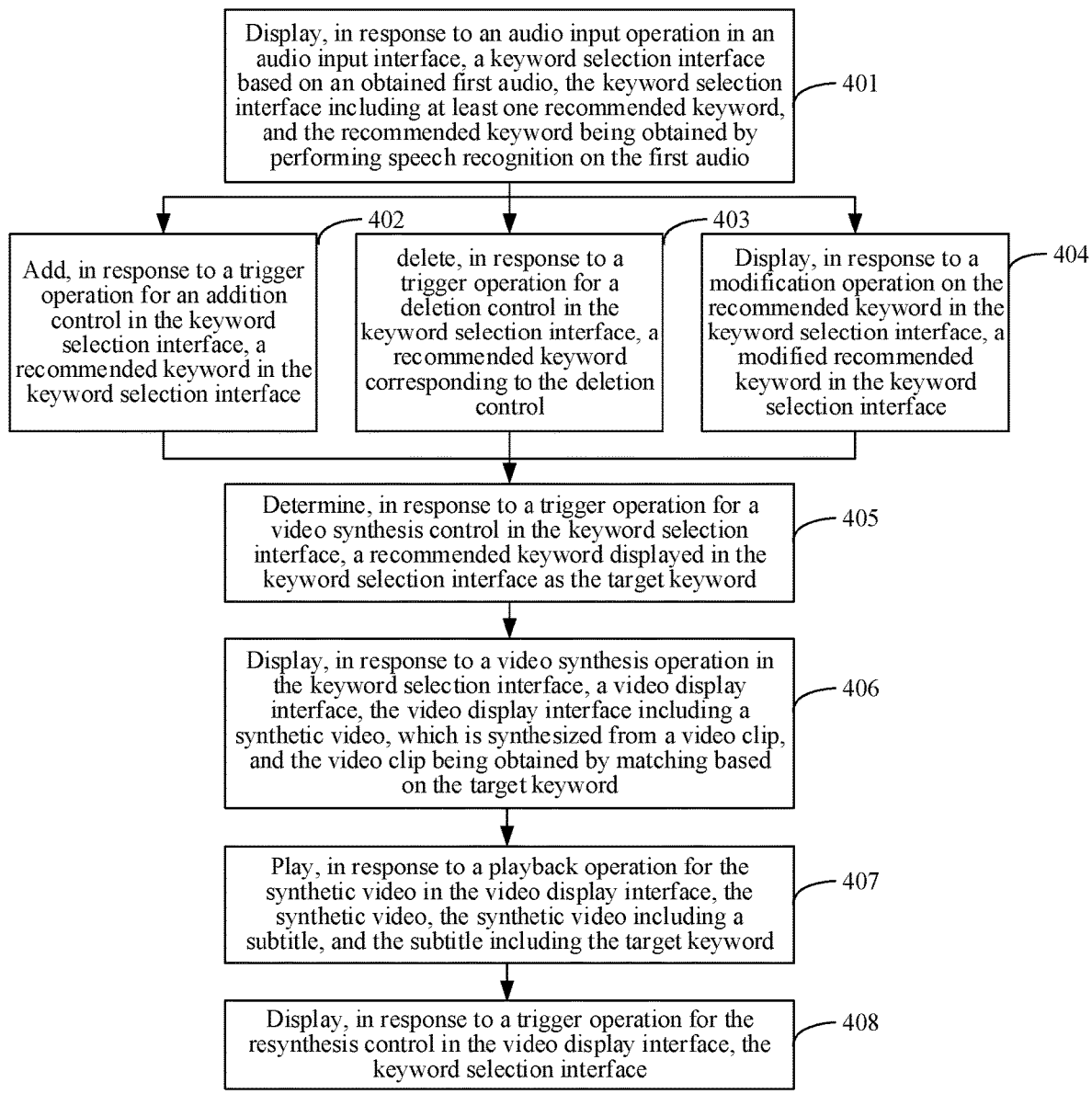
FIG. 4 is a flowchart of a video generation method provided by another exemplary embodiment of this disclosure.

In an exemplary example, FIG. 4 is a flowchart of a video generation method provided by another exemplary embodiment of this disclosure. The embodiment of this disclosure takes the application of the method to the terminal shown in FIG. 1 as an example, and the method includes the following steps:

In step 401, in response to an audio input operation in an audio input interface, a keyword selection interface is displayed based on an obtained first audio, the keyword selection interface includes at least one recommended keyword, and the recommended keyword is obtained by performing speech recognition on the first audio.

In some examples, the first audio used in the audio-to-video conversion process may be obtained by real-time audio recording by the user, or may be a pre-recorded audio file. In an exemplary example, the process of obtaining the first audio by the terminal includes step 1 and step 2.

First, in response to a trigger operation for an audio recording control in the audio input interface, the first audio is collected through a microphone.

To meet the user's timeliness requirement for audio-to-video conversion, in one possible implementation, the audio recording control is displayed in the audio input interface, and the user records the first audio in time through the audio recording control, and the terminal receives the trigger operation for the audio recording control in the audio input interface, and collects the audio through the microphone.

In some examples, the trigger operation for the audio recording control may be a click operation for the audio recording control, that is, the user clicks on the audio recording control for the first time and starts to collect an audio, the audio collecting is stopped when the user clicks on the audio recording control again, and the audio collected during the two clicks is determined as the first audio. Or, the trigger operation for the audio recording control may also be a long press operation for the audio recording control, that is, the user long presses on the audio recording control and starts to collect an audio, the audio collecting is stopped when the user stops long pressing on the audio recording control, and the audio collected during the process of long pressing on the audio recording control by the user is determined as the first audio.

In some examples, to avoid the complexity in the subsequent video generation process caused by an excessively long audio recording process, in one possible implementation, an audio recording duration is set. When the user starts to record an initial audio, a countdown of duration is displayed. After the countdown ends, even if the user does not stop recording the audio, the audio recording is automatically stopped. An audio recording duration may be 30 s. In some examples, the audio recording duration may also be customized by the user.

Figure 5:
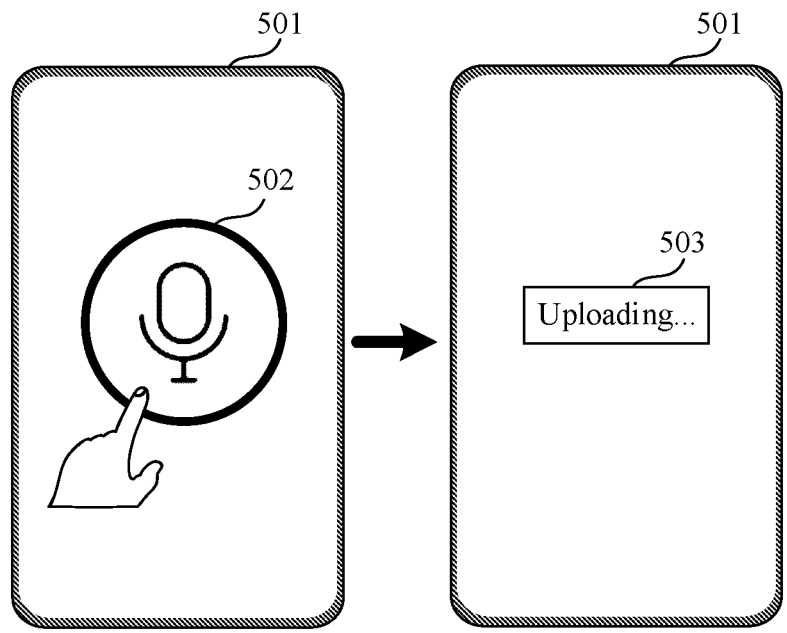
FIG. 5 is a schematic diagram of an initial audio obtaining process shown in an exemplary embodiment of this disclosure.

As shown in FIG. 5, FIG. 5 is a schematic diagram of an audio obtaining process shown in an exemplary embodiment of this disclosure. An audio recording control 502 is displayed in an audio input interface 501. When a user clicks on the audio recording control 502, the terminal receives a click operation on the audio recording control 502, and collects an audio through a microphone. When the user stops clicking on the audio recording control 502, prompt information 503 "Uploading" is displayed in the audio input interface 501 to prompt a user terminal to obtain a first audio.

Second, in response to a trigger operation for an audio upload control in the audio input interface, an audio file corresponding to the first audio is obtained.

In some examples, if the first audio that the user needs to convert from audio to video is stored in the terminal in advance, to avoid requiring the user to repeatedly perform an audio recording operation, in one possible implementation, the audio input interface includes an audio upload control. After the user clicks on the audio upload control, the terminal receives the trigger operation for the audio upload control in the audio input interface, and the user selects an audio file that needs to be converted from audio to video, so that the terminal obtains the audio file corresponding to the first audio.

In some examples, the trigger operation may be any one of a click operation, a double-click operation and a long press operation, which is not limited by the embodiment of this disclosure.

Figure 6:
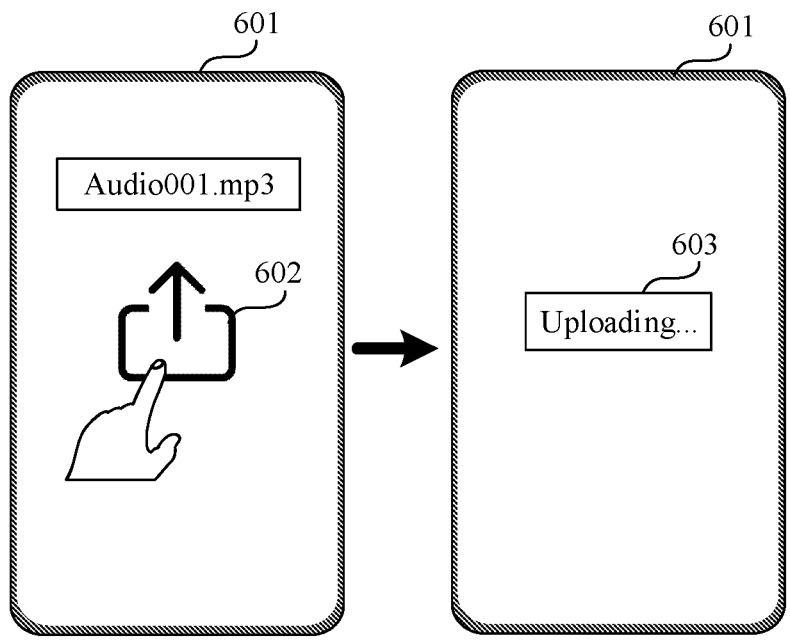
FIG. 6 is a schematic diagram of an initial audio obtaining process shown in another exemplary embodiment of this disclosure.

FIG. 6 is a schematic diagram of an audio obtaining process shown in another exemplary embodiment of this disclosure. An audio upload control 602 is displayed in an audio input interface 601. When a user clicks on the audio upload control 602, the terminal receives a click operation on the audio upload control 602 and calls a folder, and the user selects an audio file from the folder. After receiving an audio file uploading operation, prompt information 603 "Uploading" is displayed in the audio input interface 601 to prompt the user terminal to obtain the audio file corresponding to the first audio.

In some examples, a process of speech recognition on the first audio is performed by the server, in an exemplary example, step 401 includes step 401A and step 401B.

In step 401A, in response to the audio input operation in the audio input interface, the obtained first audio is transmitted to a server, the server is configured to perform speech recognition on the first audio and determine at least one recommended keyword.

In one possible implementation, after the terminal receives the audio input operation for the audio input interface, the obtained first audio is transmitted to the server, and the server performs speech recognition on an initial audio, and feeds back a determined recommended keyword to the terminal.

In some examples, the server obtain a first text content corresponding to the first audio after performing speech recognition on the initial audio, and then extracts the recommended keyword from the first text content.

Processes of speech recognition and keyword extraction on an audio by the server may refer to the following embodiment, and are not described here again.

In step 401B, the keyword selection interface is displayed based on the recommended keyword transmitted by the server.

When receiving the recommended keyword transmitted by the server, the terminal displays the recommended keyword in the keyword selection interface.

In some examples, when the recommended keyword is displayed, the recommended keyword may be displayed in sequence according to an order of the recommended keyword in the first text content corresponding to the first audio, or may be displayed in order according to the importance of the recommended keyword, or may be displayed randomly, which is not limited by the embodiment of this disclosure.

In step 402, in response to a trigger operation for an addition control in the keyword selection interface, a recommended keyword is added in the keyword selection interface.

In some examples, the edition function of the keyword selection interface at least includes: at least one of a recommended keyword addition function, a recommended keyword deletion function and a recommended keyword modification function.

Because the recommended keywords are only some words in the first text content corresponding to the audio, not all of the first text content, a situation that some keywords in the first audio are not displayed in the keyword selection interface may be present. Or after the user records the first audio, the user finds that an audio including some important keywords is forgotten to be recorded. In order to prevent the user from repeatedly recording the audio and increasing the cost of audio-to-video conversion, in one possible implementation, an addition control is provided in the keyword selection interface, so that the user may add a needed recommended keyword through the addition control. When receiving a trigger operation for the addition control, the terminal adds a recommended keyword in the keyword selection interface.

Figure 7:
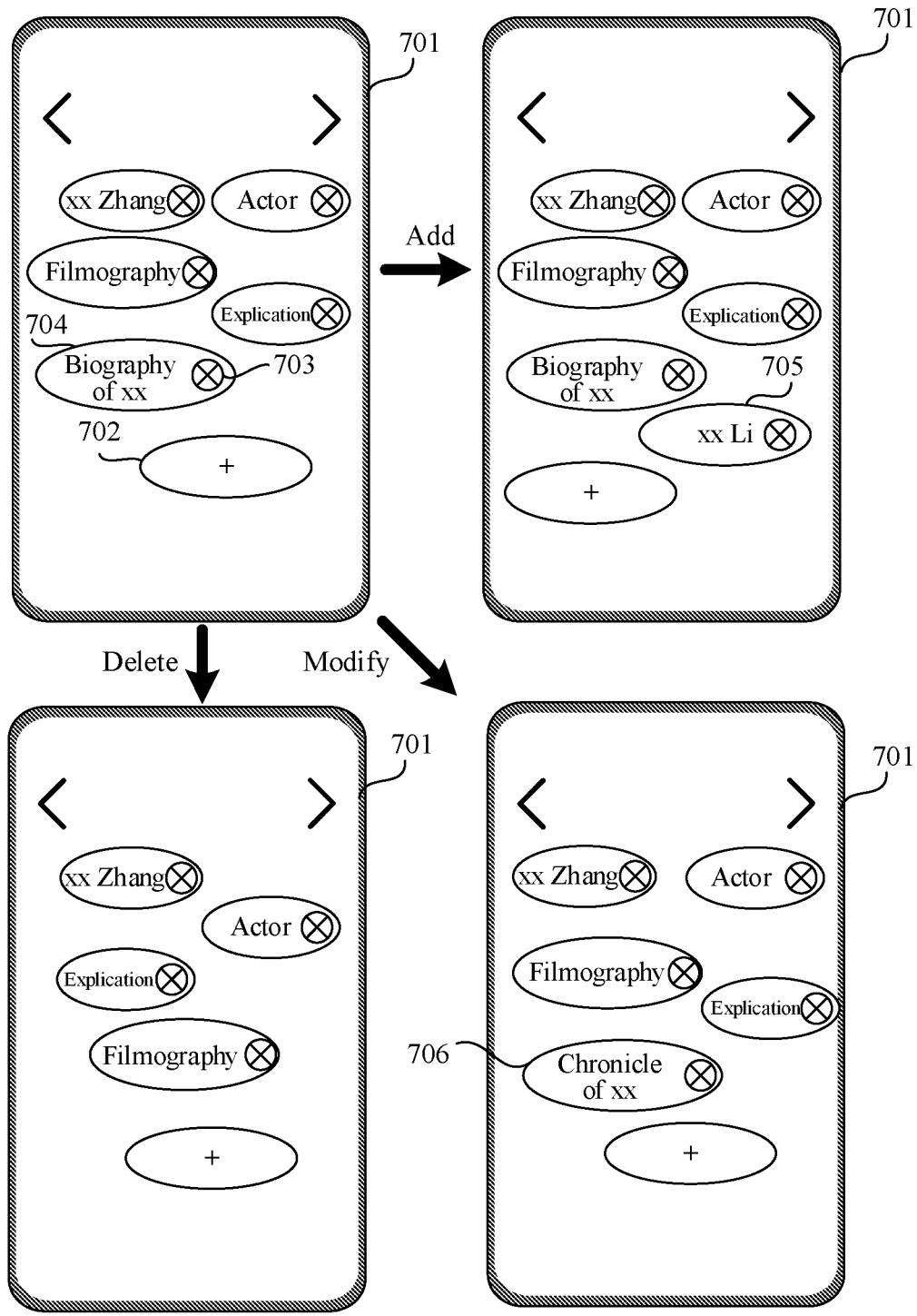
FIG. 7 is a schematic diagram of an editing process of a keyword selection interface shown in an exemplary embodiment of this disclosure.

As shown in FIG. 7, FIG. 7 is a schematic diagram of an editing process of a keyword selection interface shown in an exemplary embodiment of this disclosure. A keyword selection interface 701 includes an addition control 702, and each recommended keyword corresponds to a deletion control 703. When the user clicks on the addition control 702, the terminal receives a trigger operation for the addition control 702 in the keyword selection interface, and adds a recommended keyword 705 in the keyword selection interface 701.

Because subsequent video synthesis is required to be performed based on a target video clip matching the recommended keyword, in order to improve the fluency of a target video and avoid an abrupt video clip or video clips with discontinuous plots, when the user adds the recommended keyword in the keyword selection interface, whether to directly add the keyword in the keyword selection interface is determined by comparing a degree of association between the newly added keyword and other recommended keywords. In an exemplary example, step 402 includes step 402A to step 402C.

In step 402A, in response to the trigger operation for the addition control in the keyword selection interface, a newly added keyword is obtained.

In one possible implementation, when the terminal receives a trigger operation for the addition control in the keyword selection interface, the terminal obtains a newly added keyword, and then determines whether to directly add a recommended keyword by comparing a degree of association between the newly added keyword and other recommended keywords.

In step 402B, a degree of association between the newly added keyword and each recommended keyword is determined.

The recommended keyword needs to have a certain degree of association, and thus the video clip determined based on the recommended keyword subsequently has a certain degree of association, which is beneficial to the fluency of the subsequent synthetic video. Therefore, in one possible implementation, after the newly added keyword is obtained, the degree of association between the newly added keyword and each recommended keyword is determined to determine whether to directly add the recommended keyword.

In some examples, if the newly added keyword is a word in the first text content corresponding to the first audio, correspondingly, the newly added keyword is directly displayed in the keyword selection interface without determining the degree of association.

In step 402C, the recommended keyword is added in the keyword selection interface when the degree of association is greater than a degree of association threshold.

In an implementation example, when a degree of association between the newly added keyword and a certain recommended keyword is higher than a degree of association threshold, it means that the newly added keyword is beneficial to the subsequent synthetic video, and correspondingly, the recommended keyword is directly added in the keyword selection interface.

The degree of association threshold may be preset by a developer, and the degree of association threshold may be 85%.

In some examples, when a degree of association between the newly added keyword and any recommended keyword is less than the degree of association threshold, it may result in that the video clip determined based on the newly added keyword has less association with other video clips, which may affect the continuity of the subsequent synthetic video. In order to prompt this situation to the user, in one possible implementation, the terminal displays second prompt information when each degree of association is less than the degree of association threshold, the second prompt information being used for prompting the degree of association information. The user determines whether to still display the newly added keyword in the keyword selection interface.

In step 403, in response to a trigger operation for a deletion control in the keyword selection interface, a recommended keyword corresponding to the deletion control is deleted in the keyword selection interface.

The keyword selection interface displays not only the keyword extracted based on the first audio of the user, but also other hot words recommended based on the keyword, and thus the user selects a needed recommended keyword therefrom. Therefore, in one possible implementation, the keyword selection interface includes a deletion control, and the user deletes the recommended keyword in the keyword selection interface through the trigger operation for the target deletion control.

As shown in FIG. 7, when the user needs to delete a recommended keyword 704, the user clicks on the deletion control 703 corresponding to the recommended keyword 704, and the terminal receives a trigger operation for the deletion control 703, and deletes the recommended keyword 704 in the keyword selection interface 701.

More recommended keywords may improve the richness of a generated target video and the accuracy of a matching video clip. Therefore, in order to avoid that the quantity of remaining recommended keywords of the user is too small and affects subsequent video generation, a quantity threshold is set, so that a prompt is provided for the user in time when the quantity is lower than the quantity threshold. In an exemplary example, step 403 includes step 403A and step 403B.

In step 403A, in response to the trigger operation for the deletion control in the keyword selection interface, a keyword quantity of remaining recommended keywords is obtained.

In one possible implementation, after receiving the trigger operation for the deletion control in the keyword selection interface, the terminal obtains the keyword quantity of the remaining recommended keywords, so as to subsequently determine whether the remaining recommended keywords are enough for synthesizing a video.

In step 403B, the recommended keyword corresponding to the deletion control is deleted in the keyword selection interface when the keyword quantity is higher than a quantity threshold.

When it is determined that the keyword quantity is higher than a quantity threshold, it means that the remaining recommended keywords are enough for generating an informative video, and the recommended keyword corresponding to the deletion control in the keyword selection interface is directly deleted.

In some examples, if the keyword quantity is lower than the quantity threshold, it means that the remaining recommended keywords may not be enough for generating the informative video, it is necessary to prompt the user whether to delete the recommended keyword, and the terminal displays first prompt information, which is used for prompting the quantity of the remaining keywords.

The quantity threshold may be set by a developer, and the quantity threshold may be 5.

In step 404, in response to a modification operation on the recommended keyword in the keyword selection interface, a modified recommended keyword is displayed in the keyword selection interface.

When speech recognition is wrong, there may be an error between the recommended keyword and the recommended keyword that the user wants. In order to avoid the user needing to repeatedly record an audio and the terminal repeatedly performing keyword extraction, in one possible implementation, the keyword selection interface provides a modification function for recommended keyword. The user long presses a recommended keyword that needs to be modified and inputs a modified recommended keyword, and the terminal displays the modified recommended keyword in the keyword selection interface.

As shown in FIG. 7, when the user needs to modify the recommended keyword 704, the user long presses the recommended keyword 704, inputs a modified recommended keyword, and correspondingly displays the modified recommended keyword 706 in the keyword selection interface 701.

In step 405, in response to a trigger operation for a video synthesis control in the keyword selection interface, a recommended keyword displayed in the keyword selection interface is determined as the target keyword.

In order to make the terminal determine that the user has completed editing the recommended keyword, in one possible implementation, the video synthesis control is displayed in the keyword selection interface. When receiving the trigger operation for the video synthesis control in the keyword selection interface, the terminal determines that editing of the recommended keyword is completed, and the recommended keyword finally displayed in the keyword selection interface is determined as a target keyword.

In step 406, in response to a video synthesis operation in the keyword selection interface, a video display interface is displayed, the video display interface includes a synthetic video, which is synthesized from a video clip, and the video clip is obtained by matching based on the target keyword.

In some examples, a video synthesis process is performed by the server. In an exemplary example, step 406 includes step 406A and step 406B.

In step 406A, in response to the trigger operation for the video synthesis control in the keyword selection interface, the target keyword is transmitted to a server, the server is configured to perform video clip matching based on the target keyword to obtain at least one video clip, and generate the synthetic video based on the video clip.

In one possible implementation, after the terminal receives the trigger operation for the video synthesis control in the keyword selection interface, the target keyword is determined based on the recommended keyword finally displayed in the keyword selection interface, and then a video synthesis request is transmitted to the server based on the target keyword. The video synthesis request includes the target keyword. After receiving the video synthesis request, the server performs video clip matching based on the keyword to match at least one video clip, and then performs video synthesis based on the video clip.

In step 406B, the video display interface is displayed based on the synthetic video transmitted by the server.

In some examples, the server feeds back the synthetic video to the terminal, and the terminal displays the video display interface based on the synthetic video transmitted by the server.

Figure 8:
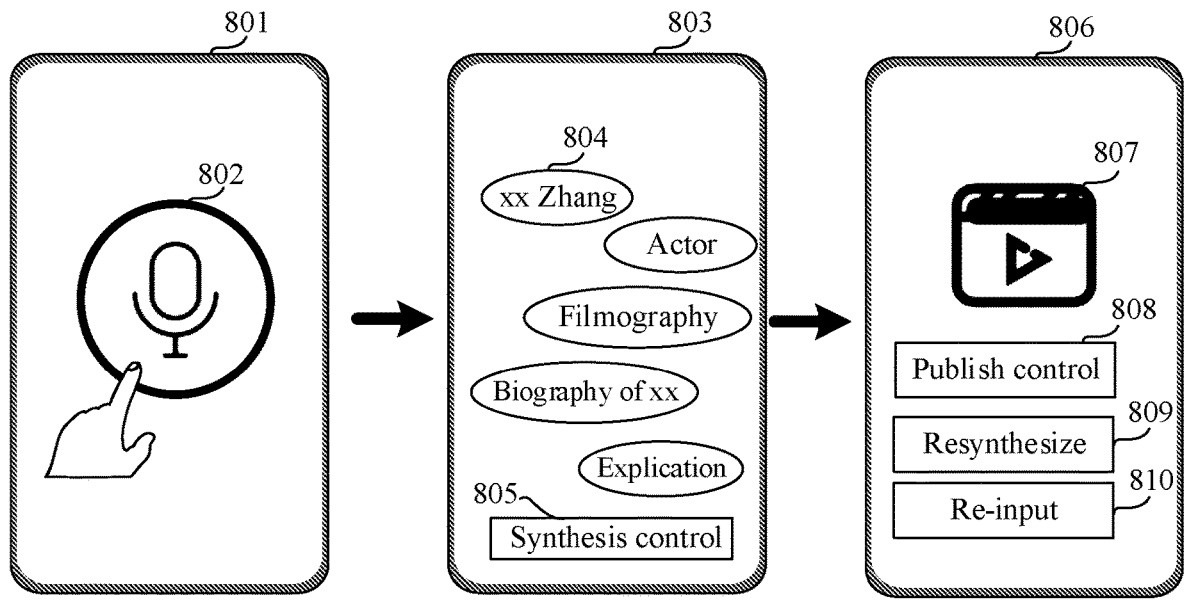
FIG. 8 is a schematic diagram of a video generation process shown in another exemplary embodiment of this disclosure.

FIG. 8 is a schematic diagram of a video generation process shown in another exemplary embodiment of this disclosure. When the user clicks on an audio input control 802 in an audio input interface 801, the terminal receives an audio input operation for the audio input interface 801 to obtain the first audio. A recommended keyword 804 obtained by speech recognition based on the first audio is displayed in a keyword selection interface 803. When the user clicks on a synthesis control 805 in the keyword selection interface 803, the terminal receives a video synthesis operation in keyword selection interface 803 and transmits the video synthesis request to the server. The terminal displays a synthetic video 807 in a video display interface 806 based on the synthetic video fed back from the server.

In step 407, in response to a playback operation for the synthetic video in the video display interface, the synthetic video is played, the synthetic video includes a subtitle, and the subtitle including the target keyword.

In some examples, the synthetic video is not only obtained by splicing the video clip, but also includes a subtitle and dubbing. The synthetic video is indirectly generated by the target keyword, and correspondingly, the subtitle included in the synthetic video also includes the target keyword.

A process of generating a subtitle and dubbing may refer to the following embodiment, and are not described here again.

In step 408, in response to a trigger operation for the resynthesis control in the video display interface, the keyword selection interface is displayed.

In some examples, the video display interface displays the resynthesis control.

When the synthetic video does not meet the user's expectation, in order to avoid the user needing to re-record an audio and repeatedly performing an operation of audio-to-video conversion, in one possible implementation, the user clicks on the resynthesis control in the video display interface, returns to the keyword selection interface, and re-edits the recommended keyword, to re-synthesize the video.

As shown in FIG. 8, after the user clicks on a resynthesis control 809 in the video display interface 806, the keyword selection interface 803 is displayed and a recommended keyword editing operation is performed again. In some examples, the video display interface 806 also displays a publish control 808 and a re-input control 810. The publish control 808 is configured to publish a target video 807 to another video platform, and the re-input control 810 is configured to return to the audio input interface 801 and re-preform the audio input operation.

In some embodiments, in order to achieve more accurate video editing, each recommended keyword is correspondingly provided with a clip preview control in the redisplayed keyword selection interface. When receiving a trigger operation for the clip preview control, the terminal displays a video clip corresponding to the recommendation keyword. The user selects, according to a video clip preview result, a video clip to be selected again. In subsequent video synthesis, only the selected part of the video clip is replaced, while the rest unselected video clip is not replaced, allowing for more fine-grained video editing.

In the embodiment, through a recommended keyword editing function provided by the keyword selection interface, the user modifies, deletes and adds a recommended keyword, so that a final target keyword is in line with the user's expectation, so as to avoid repeatedly performing the operation of audio-to-video conversion, improve the generation efficiency of high-quality videos, and thus improve the video publishing efficiency.

The embodiment above takes a case that an editing operation in the keyword selection interface includes addition, deletion and modification as an example. In another possible implementation, the editing operation also includes an importance setting operation, for example, setting an importance tag for a recommended keyword in the keyword selection interface, so as to perform video clip matching and synthesis based on the target keyword and its corresponding importance tag, and improve the proportion of a video clip corresponding to an important keyword in the synthetic video. This embodiment is not limited herein.

The embodiment above mainly describes a video generation process on a terminal side. The video generation process is completed by interaction between a terminal and a server side. This embodiment focuses on the video generation process on a server side.

Figure 9:
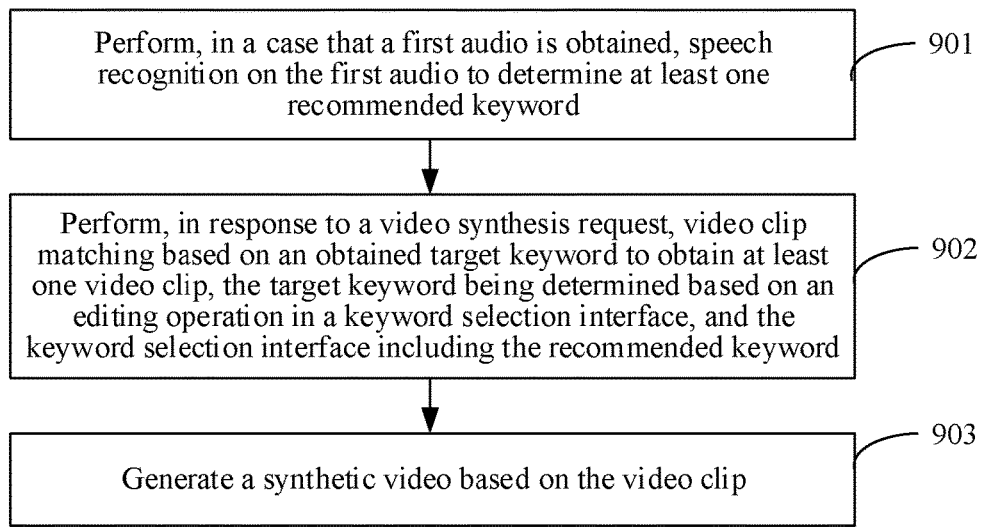
FIG. 9 is a flowchart of a video generation method provided by an exemplary embodiment of this disclosure.

FIG. 9 is a flowchart of a video generation method provided by an exemplary embodiment of this disclosure. The embodiment of this disclosure takes the application of the method to the server shown in FIG. 1 as an example. The method includes the following steps:

In step 901, when a first audio is obtained, speech recognition on the first audio is performed to determine at least one recommended keyword.

In this embodiment, the speech recognition process on the first audio and the video synthesis process are performed by the server side.

In one possible implementation, after the terminal obtains the first audio, the first audio is transmitted to the server, and the server receives the first audio, performs speech recognition on the first audio, and determines at least one recommended keyword.

In some examples, after determining the recommended keyword, the server does not directly perform video clip matching and subsequent video synthesis based on the recommended keyword, but needs to feed the recommended keyword to the terminal, so that the terminal displays the keyword selection interface based on the received recommended keyword, and the user further confirms the keyword.

In step 902, in response to a video synthesis request, video clip matching is performed based on an obtained target keyword to obtain at least one video clip, the target keyword is determined based on an editing operation in a keyword selection interface, and the keyword selection interface includes the recommended keyword.

In order to improve the accuracy of the subsequent video generation, it is necessary to ensure the accuracy of the target keyword (recommended keyword). Therefore, in one possible implementation, after the user performs an editing operation on the recommended keyword in the keyword selection interface of the terminal, the terminal transmits the target keyword confirmed by the user to the server, and then the server performs the subsequent video generation process base on the target keyword.

In some examples, when receiving the video synthesis request, the server obtains the target keyword from the video synthesis request, and then performs video clip matching based on the obtained target keyword to obtain at least one video clip.

For a process of performing video clip matching based on a target keyword, in one possible implementation, a similarity between the target keyword and a video tag of a candidate video clip is determined by comparison. When the similarity is higher than a similarity threshold, the candidate video clip is determined as a video clip corresponding to the target keyword. The similarity threshold may be 85%.

In some examples, the server may input the candidate video clip into a video understanding model, and the video understanding model extracts spatial-temporal information of the candidate video clip for scene recognition, motion capture and emotion analysis, and extracts scene information, object information, character expression and motion information of the candidate video clip as video tags of the candidate video clip.

In some examples, when the similarity between the target keyword and the video tag is calculated, the target keyword and the video tag are converted into feature vectors, and then the similarity is determined according to a feature distance between the two feature vectors. The feature distance may be a cosine distance.

In step 903, a synthetic video is generated based on the video clip.

In one possible implementation, the server synthesizes the synthetic video based on the video clip. The synthetic video is fed back to the terminal and displayed by the terminal in the video display interface.

In some examples, when the server syntheses a video based on the video clip, when there are a plurality of target keywords and two or more video clips are obtained by matching, a plurality of video clips are spliced to obtain a synthetic video. Dubbing and a subtitle in the synthetic video may adopt original dubbing and an original subtitle in the video clips. Or, the server may generate new dubbing and a new subtitle based on the target keywords, then splice the plurality of video clips and combine them with the dubbing and the subtitle to obtain the synthetic video. In some examples, when only a single target keyword is included and a single video clip is obtained by matching, the target video is synthesized based on the video clip, dubbing and a subtitle.

In summary, in the embodiment of this disclosure, by performing speech recognition on an initial audio input by a user, determining a recommended keyword, then performing video clip matching based on the recommended keyword, and generating a synthetic video based on the matching video clip, conversion from the audio to a related video is realized. In a video generation scene, a user may obtain a speech-related video by inputting a piece of speech, so that the video generation efficiency is improved, and then the video publishing efficiency is improved. Also provided is a keyword selection interface, so that a user may manually adjust a recommended keyword, thus making a generated video more in line with the user's needs.

When a plurality of video clips are obtained by matching, the video clips need to be spliced and combined, and a video splicing order may affect the fluency of the generated video. In one possible implementation, the first audio may provide a reference for a video clip splicing order.

Figure 10:
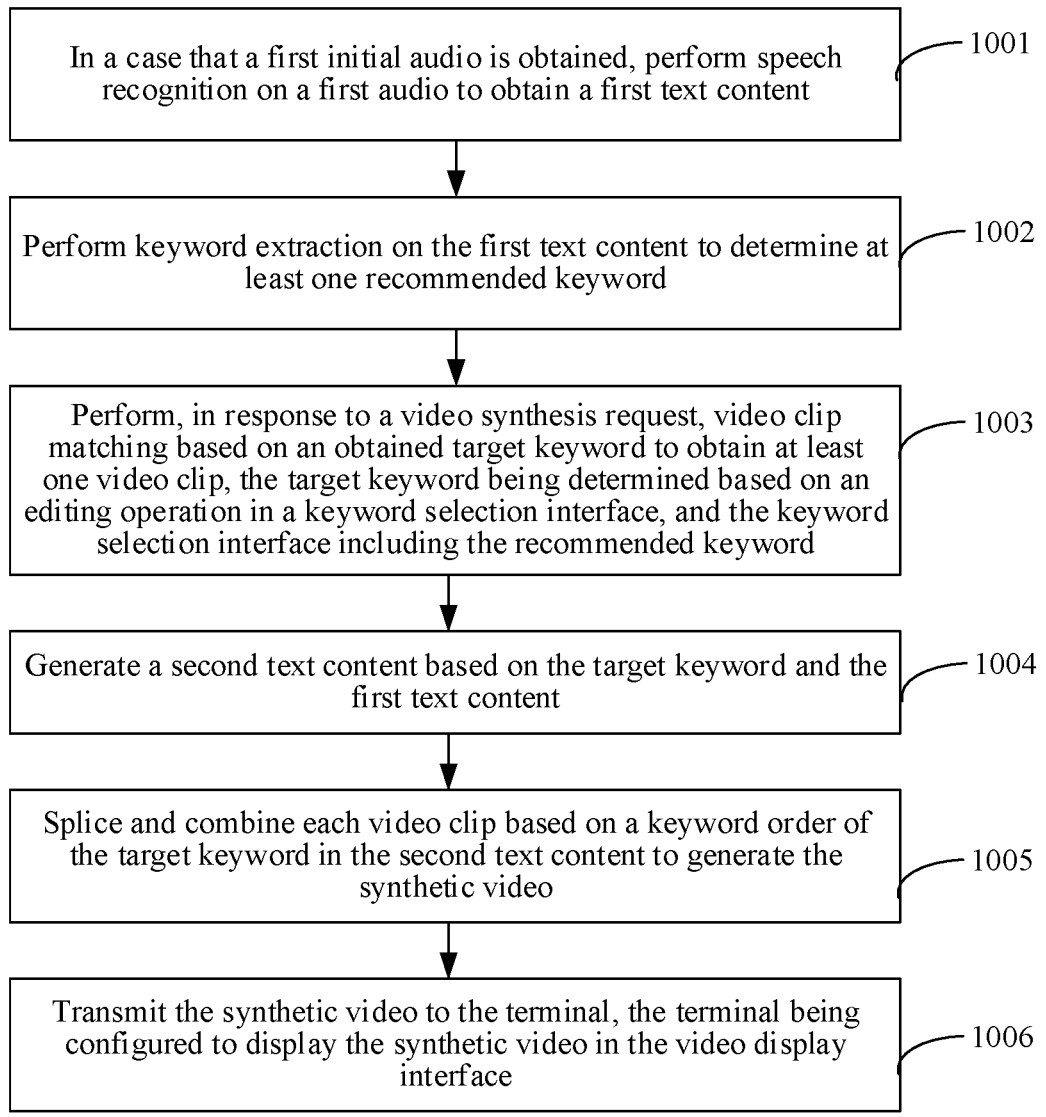
FIG. 10 is a flowchart of a video generation method provided by another exemplary embodiment of this disclosure.

FIG. 10 is a flowchart of a video generation method provided by another exemplary embodiment of this disclosure. The embodiment of this disclosure takes the application of the method to the server shown in FIG. 1 as an example. The method includes the following steps:

In step 1001, when a first audio is obtained, speech recognition is performed on the first audio to obtain a first text content.

In one possible implementation, when receiving an initial audio transmitted by the terminal, the server first performs speech recognition on the initial audio, and converts the audio into an initial text content.

The conversion from the first audio to the first text content adopts a dynamic time warping-based algorithm, a parametric model-based hidden Markov model, a non-parametric model-based vector quantization method and an artificial neural network-based algorithm. The embodiment of this disclosure does not limit the specific mode for speech recognition.

In step 1002, keyword extraction is performed on the first text content to determine at least one recommended keyword.

When obtaining the first text content, the server performs keyword extraction on the first text content to extract at least one recommended keyword therefrom.

In some examples, the keyword extraction mode may adopt an artificial intelligence natural language processing technology. The first text content is input into a keyword extraction model, and the keyword extraction model outputs a keyword sequence. The keyword extraction model is incorporated by an embedding layer, a two-way Long Short-Term Memory (LSTM), a Soft Max hiding layer, and a Conditional Random Field (CRF) supervision layer.

In some examples, after obtaining the first text content, the server deletes a meaningless text segment, such as a modal particle, in the first text content, and then inputs the first text content in which the meaningless text segment is deleted into the keyword extraction model for keyword extraction, which improves the keyword extraction efficiency.

In step 1003, in response to a video synthesis request, video clip matching is performed based on an obtained target keyword to obtain at least one video clip, the target keyword is determined based on an editing operation in a keyword selection interface, and the keyword selection interface includes the recommended keyword.

In some examples, the video synthesis request is transmitted by the terminal after receiving the video synthesis operation for keyword selection interface. In an exemplary example, step 1003 includes step 1003A and step 1003B.

In step 1003A, the target keyword is obtained based on the video synthesis request transmitted by a terminal, the video synthesis request is transmitted by the terminal after receiving a video synthesis operation in the keyword selection interface.

In one possible implementation, when receiving a trigger operation for the video synthesis control in the keyword selection interface, the terminal confirms receiving the video synthesis operation in the keyword selection interface, and then transmits a video synthesis request to the server, the video synthesis request including the target keyword, so that the server performs a subsequent video synthesis operation based on the target keyword.

In step 1003B, video clip matching is performed based on the target keyword to obtain at least one video clip.

In some examples, when performing video clip matching based on the target keyword, one video clip may be determined based on a single target keyword, and then video synthesis is performed based on the video clip corresponding to each keyword.

In some examples, two or more video clips may be obtained by matching based on a single target keyword, and then a plurality of synthetic videos may be generated considering different combinations of video clips and pushed to the terminal, so that the user performs selection from the plurality of synthetic videos.

In some embodiments, in addition to the target keyword, the video synthesis request further includes an importance tag corresponding to the target keyword. During video clip matching, the server determines the video clip corresponding to the target keyword based on the importance tag. The higher the importance represented by the importance tag is, the larger the quantity of video clips corresponding to the target keyword is, or the longer the duration is.

In some examples, the importance tag may be set by the user through an importance setting operation in the keyword selection interface. The importance setting operation may be performed without an initial importance tag, or may be performed based on an initial importance tag provided by the server. The initial importance tag is determined by the server based on a keyword recognition result.

In step 1004, a second text content is generated based on the target keyword and the first text content.

The target keyword includes not only the recommended keyword in the first text content, but also a newly added keyword (i.e., a keyword outside of the first text content) of the user. In one possible implementation, the first text content needs to be modified based on the target keyword to generate the second text content.

In an exemplary example, step 1004 includes step 1004A to step 1004C.

In step 1004A, the second text content is generated based on the first text content in response to the target keyword belonging to the first text content.

When the user merely deletes some recommended keywords of the recommended keywords, part of the first text content is irrelevant to the target keyword. Therefore, in one possible implementation, the first text content is deleted based on the target keyword, that is, the text content without the target keyword is deleted, and the deleted text content is determined as the second text content.

In some examples, when the first text content includes all the target keywords and there is no irrelevant text content, the first text content may be directly determined as the second text content.

In step 1004B, in response to the target keyword not belonging to the first text content, a description text corresponding to the target keyword is generated based on the target keyword.

In one possible implementation, when the target keyword is a newly added recommended keyword, and the first text content does not include the target keyword, in order to make the generated second text content include the target keyword, it is necessary to generate a description text corresponding to the target keyword based on the target keyword and contextual semantics of the first text content. The description text is then added to the first text content to obtain a final second text content.

In some examples, because the second text content is used for determining subtitle information in the synthetic video, in another possible implementation, a description text may also be generated based on the video clip corresponding to the target keyword. In an exemplary example, step 1004B further includes step 3 and step 4.

Third, the video clip corresponding to the target keyword is obtained.

In some examples, when the first text content does not include the target keyword, the video clip corresponding to the target keyword is obtained first, and then the description text related to the target keyword is generated based on the video clip.

Forth, the description text corresponding to the target keyword is determined based on the video clip.

In some examples, the server generates description text related to the target keywords based on original subtitle information of the video clip.

In some examples, the server performs video semantic recognition on the video clip, so as to obtain the description text based on a video semantic recognition result.

In step 1004C, the second text content is generated based on the first text content and the description text.

The description text is added to the first text content based on the contextual semantics of the first text content, and then the second text content is generated.

In some examples, after the second text content is generated, a corresponding subtitle may be generated based on the second text content for subsequent addition to the synthetic video.

In some examples, after the subtitle is generated, the subtitle is converted into a second speech (dubbing) through a speech synthesis technology for subsequent addition of the second speech to the synthetic video.

In some examples, the user's own voice may be used for dubbing. In one possible implementation, the server performs speech synthesis based on the second text content and an acoustic characteristic of the first audio to obtain a second audio, text content corresponding to the second audio being the second text content and the second audio having the acoustic characteristic of the first audio. In the subsequent video generation, the server generates the synthetic video based on the video clip and the second audio.

For example, the server extracts the acoustic characteristic of the user from the first audio, and then performs speech synthesis based on the acoustic characteristic and the second text content, so as to generate the second audio with a sound characteristic of the user.

In step 1005, splice and combine operations are performed on each video clip based on a keyword order of the target keyword in the second text content to generate the synthetic video.

In order to make the finally generated video meet speaking habits (consistent with the first audio) of the user, in one possible implementation, each video clip may be spliced and combined based on the keyword order of the target keywords in the second text content, and then the synthetic video is generated.

In some examples, a target subtitle and dubbing are added and rendered in the synthetic video to obtain a final feedback to the synthetic video of the terminal.

In step 1006, the synthetic video is transmitted to the terminal, the terminal is configured to display the synthetic video in the video display interface.

In one possible implementation, after the synthetic video is generated by the server, the synthetic video is fed back to the terminal, so that the terminal displays the synthetic video in the video display interface.

In the embodiment, by obtaining the keyword order of the target keyword in the text content and splicing the video clip, the generated video is more in line with the speaking habits of the user, thus improving the accuracy of the video.

In addition, in the embodiment, the server automatically generates the description text in combination with the video content of the video clip, and combines the description text with the first text content corresponding to the recorded audio to obtain the second text content, which enriches the expression of the text content. Moreover, dubbing is synthesized based on the second text content and the acoustic characteristic of the first audio, so that the generated dubbing has the same timbre as the recorded audio, improving the authenticity of the dubbing of the synthetic video.

The embodiment above makes description by taking the recommended keyword recognition being executed by the server as an example. In another possible implementation, the terminal may also perform the recommended keyword recognition and provide the determined target keyword for the server, so as to reduce the processing pressure of the server.

Of course, in another possible implementation, the recommended keyword recognition, video clip matching, dubbing synthesis and video synthesis may be performed jointly by the terminal and the server, that is, part of the operation is performed by the terminal and part of the operation is performed by the server, which is not limited by the embodiment of this disclosure.

Figure 11:
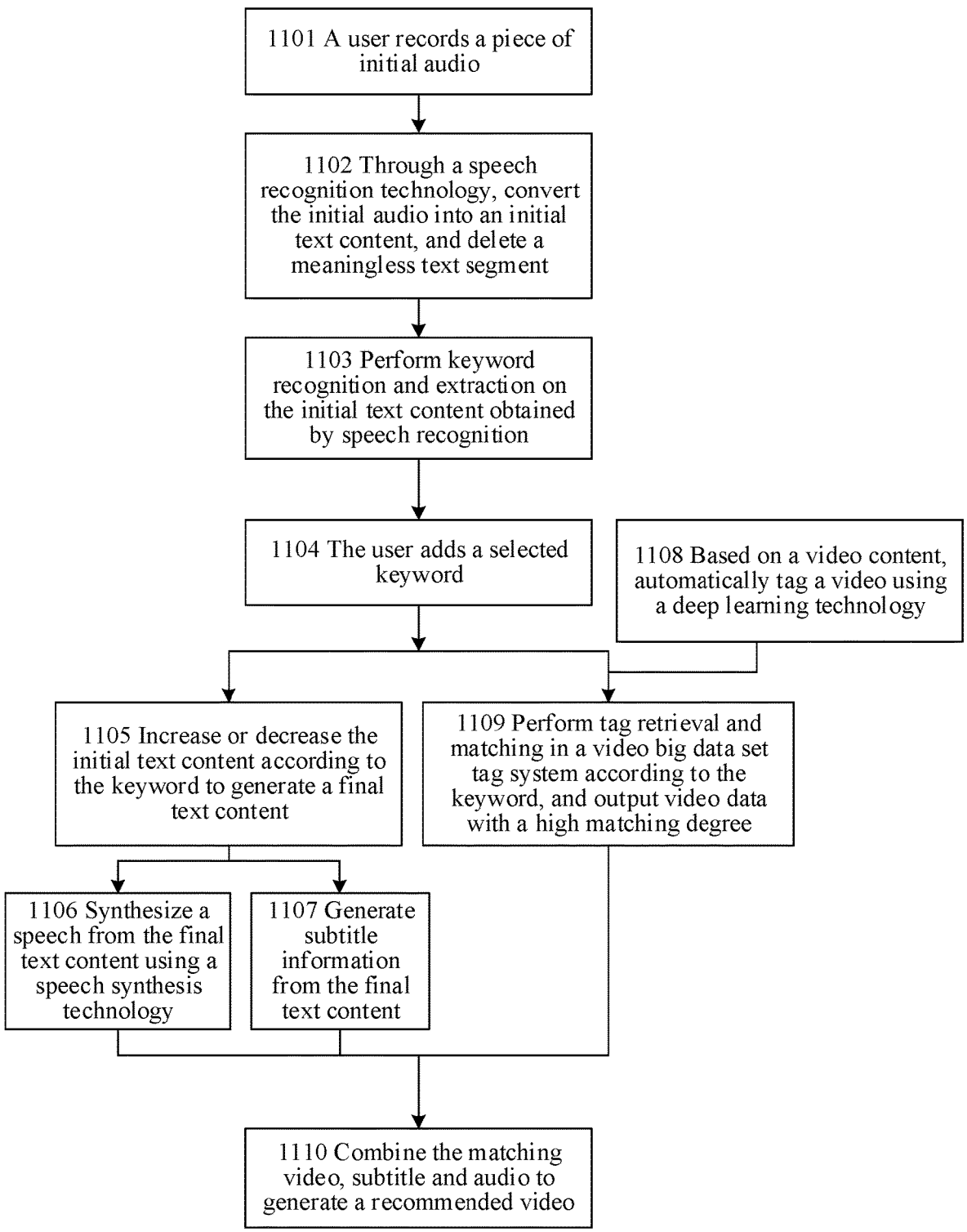
FIG. 11 is a flowchart of a video generation method shown in an exemplary embodiment of this disclosure.

FIG. 11 is a flowchart of a video generation method shown in an exemplary embodiment of this disclosure. The method includes the following steps:

In step 1101, a user records a piece of initial audio.

In step 1102, through a speech recognition technology, the initial audio is converted into an initial text content, and a meaningless text segment is deleted.

In step 1103, keyword recognition and extraction are performed on the initial text content obtained by speech recognition.

In step 1104, the user adds a selected keyword.

In step 1105, the initial text content is increased or decreased according to the keyword to generate a final text content.

In step 1106, a speech is synthesized from the final text content using a speech synthesis technology.

In step 1107, subtitle information is generated from the final text content.e In step 1108, based on a video content, a video is automatically tagged using a deep learning technology.

In step 1109, tag retrieval and matching in a video big data set tag system are performed according to the keyword, and video data with a high matching degree is output.

In step 1110, the matching video, subtitle and audio are combined to generate a recommended video.

The following describes apparatus embodiments of this disclosure. For details not described in detail in the apparatus embodiments, please refer to the method embodiments above.

Figure 12:
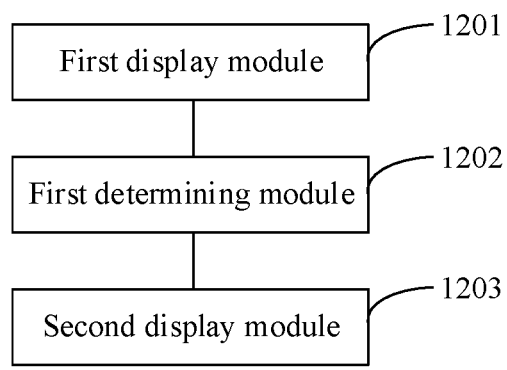
FIG. 12 is a structural block diagram of a video generation apparatus provided by an exemplary embodiment of this disclosure.

FIG. 12 is a structural block diagram of a video generation apparatus provided by an exemplary embodiment of this disclosure. The apparatus includes a first display module 1201, a first determining module 1202, and a second display module 1203.

The first display module 1201 is configured to display, in response to an audio input operation in an audio input interface, a keyword selection interface based on an obtained second audio, the keyword selection interface including at least one recommended keyword, and the recommended keyword is obtained by performing speech recognition on the first audio.

The first determining module 1202 is configured to determine, in response to an editing operation on the recommended keyword in the keyword selection interface, at least one target keyword.

The second display module 1203 is configured to display, in response to a video synthesis operation in the keyword selection interface, a video display interface, the video display interface includes a synthetic video, which is synthesized from a video clip, and the video clip is obtained by matching based on the target keyword.

In some examples, the first determining module 1202 includes an addition unit, a deletion unit, a modification unit, and a first determining unit.

The addition unit is configured to add, in response to a trigger operation for an addition control in the keyword selection interface, a recommended keyword in the keyword selection interface.

The deletion unit is configured to delete, in response to a trigger operation for a deletion control in the keyword selection interface, a recommended keyword corresponding to the deletion control.

The modification unit is configured to display, in response to a modification operation on the recommended keyword in the keyword selection interface, a modified recommended keyword in the keyword selection interface.

The first determining unit is configured to determine, in response to a trigger operation for a video synthesis control in the keyword selection interface, a recommended keyword displayed in the keyword selection interface as the target keyword.

In some examples, the deletion unit is further configured to:

obtain, in response to the trigger operation for the deletion control in the keyword selection interface, a keyword quantity of remaining recommended keywords; and delete the recommended keyword corresponding to the deletion control when the keyword quantity is higher than a quantity threshold.

The apparatus further includes a third display module that is configured to display first prompt information when the keyword quantity is lower than the quantity threshold, the first prompt information is used for prompting the quantity of remaining keywords.

In some examples, the addition unit is further configured to:

obtain, in response to the trigger operation for the addition control in the keyword selection interface, a newly added keyword;

determine a degree of association between the newly added keyword and each recommended keyword; and add the recommended keyword in the keyword selection interface when the degree of association is greater than a degree of association threshold.

The apparatus further includes A fourth display module that is configured to display second prompt information when each degree of association is less than the degree of association threshold, the second prompt information is used for prompting degree of association information.

In some examples, the video display interface displays a resynthesis control.

The apparatus further includes a fifth display module that is configured to display, in response to a trigger operation for the resynthesis control in the video display interface, the keyword selection interface.

In some examples, the first display module 1201 includes a first obtaining unit that is configured to collect, in response to a trigger operation for an audio recording control in the audio input interface, the first audio through a microphone.

In some examples, the first display module 1201 includes a second obtaining unit that is configured to obtain, in response to a trigger operation for an audio upload control in the audio input interface, an audio file corresponding to the first audio.

In some examples, the apparatus further includes a playback module that is configured to play, in response to a playing operation for the synthetic video in the video display interface, the synthetic video, the synthetic video including a subtitle, and the subtitle including the target keyword.

In some examples, the first display module 1201 includes a first transmitting unit and a first display unit.

The first transmitting unit is configured to transmit, in response to the audio input operation in the audio input interface, the obtained initial audio to a server, the server being configured to perform speech recognition on the initial audio and determine at least one recommended keyword.

The first display unit is configured to display the keyword selection interface based on the recommended keyword transmitted by the server.

In some examples, the second display module 1203 includes a second transmitting unit and a second display unit.

The second transmitting unit is configured to transmit, in response to the trigger operation for the video synthesis control in the keyword selection interface, the target keyword to a server, the server being configured to perform video clip matching based on the target keyword to obtain at least one video clip, and generate the synthetic video based on the video clip.

The second display unit is configured to display the video display interface based on the synthetic video transmitted by the server.

Figure 13:
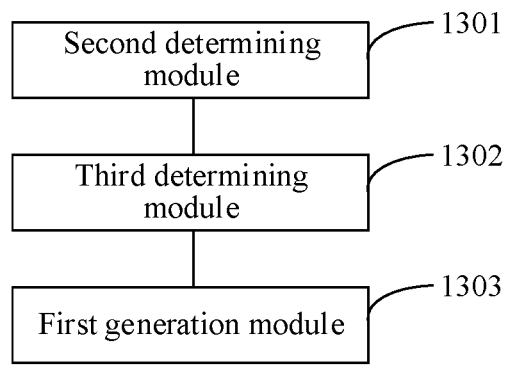
FIG. 13 is a structural block diagram of a video generation apparatus provided by an exemplary embodiment of this disclosure.

FIG. 13 is a structural block diagram of a video generation apparatus provided by an exemplary embodiment of this disclosure. The apparatus includes a second determining module 1301, a third determining module 1302 and a first generation module 1303.

The second determining module 1301 is configured to perform, when a first audio is obtained, speech recognition on the first audio to determine at least one recommended keyword.

The third determining module 1302 is configured to perform, in response to a video synthesis request, video clip matching based on an obtained target keyword to obtain at least one video clip, the target keyword is determined based on an editing operation in a keyword selection interface, and the keyword selection interface includes the recommended keyword.

The first generation module 1303 is configured to generate a synthetic video based on the video clip.

In some examples, the second determining module 1301 includes a recognition unit and a second determining unit.

The recognition unit is configured to perform speech recognition on the first audio to obtain a first text content.

The second determining unit is configured to perform keyword extraction on the first text content to determine at least one recommended keyword.

The apparatus further includes a second generation module that is configured to generate a second text content based on the target keyword and the first text content.

The first generation module includes a first generation unit that is configured to splice and combine each second video clip based on a keyword order of the target keyword in the second text content to generate the synthetic video.

In some examples, the second generation module includes a second generation unit that is configured to generate the second text content based on the first text content when the target keyword belongs to the first text content.

In some examples, the second generation module includes a third generation unit that is configured to generate a description text corresponding to the target keyword when the target keyword does not belong to the first text content.

In some examples, the second generation module includes a fourth generation unit that is configured to generate the second text content based on the first text content and the description text.

In some examples, the third generation unit is configured to obtain the video clip corresponding to the target keyword, and determine the description text corresponding to the target keyword based on the video clip.

In some examples, the apparatus further includes a dubbing generation module that is configured to perform speech synthesis based on the second text content and an acoustic characteristic of the first audio to obtain a second audio, text content corresponding to the second audio being the second text content and the second audio having the acoustic characteristic of the first audio. The first generation module 1303 is configured to generate the synthetic video based on the video clip and the second audio.

In some examples, the third determining module 1302 includes a third obtaining module that is configured to obtain the target keyword based on the video synthesis request transmitted by a terminal, the video synthesis request being transmitted by the terminal after receiving a video synthesis operation in the keyword selection interface; and a third determining unit that is configured to perform video clip matching based on the target keyword and a video tag to obtain at least one video clip.

The apparatus further includes a transmitting module that is configured to transmit the synthetic video to the terminal, the terminal being configured to display the synthetic video in the video display interface.

It is noted that the term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The embodiments of this disclosure provide a computer device, including a processor and a memory. The memory stores at least one program. The at least one program is loaded and executed by the processor to implement the video generation method as provided in some implementation above. In some examples, the computer device may be implemented as a terminal or server in the embodiment above.

When the computer device is a terminal, the terminal may be configured to perform the video generation method on the terminal side of some implementation above. When the computer device is a server, the server may be configured to perform the video generation method on the server side of some implementation above.

Figure 14:
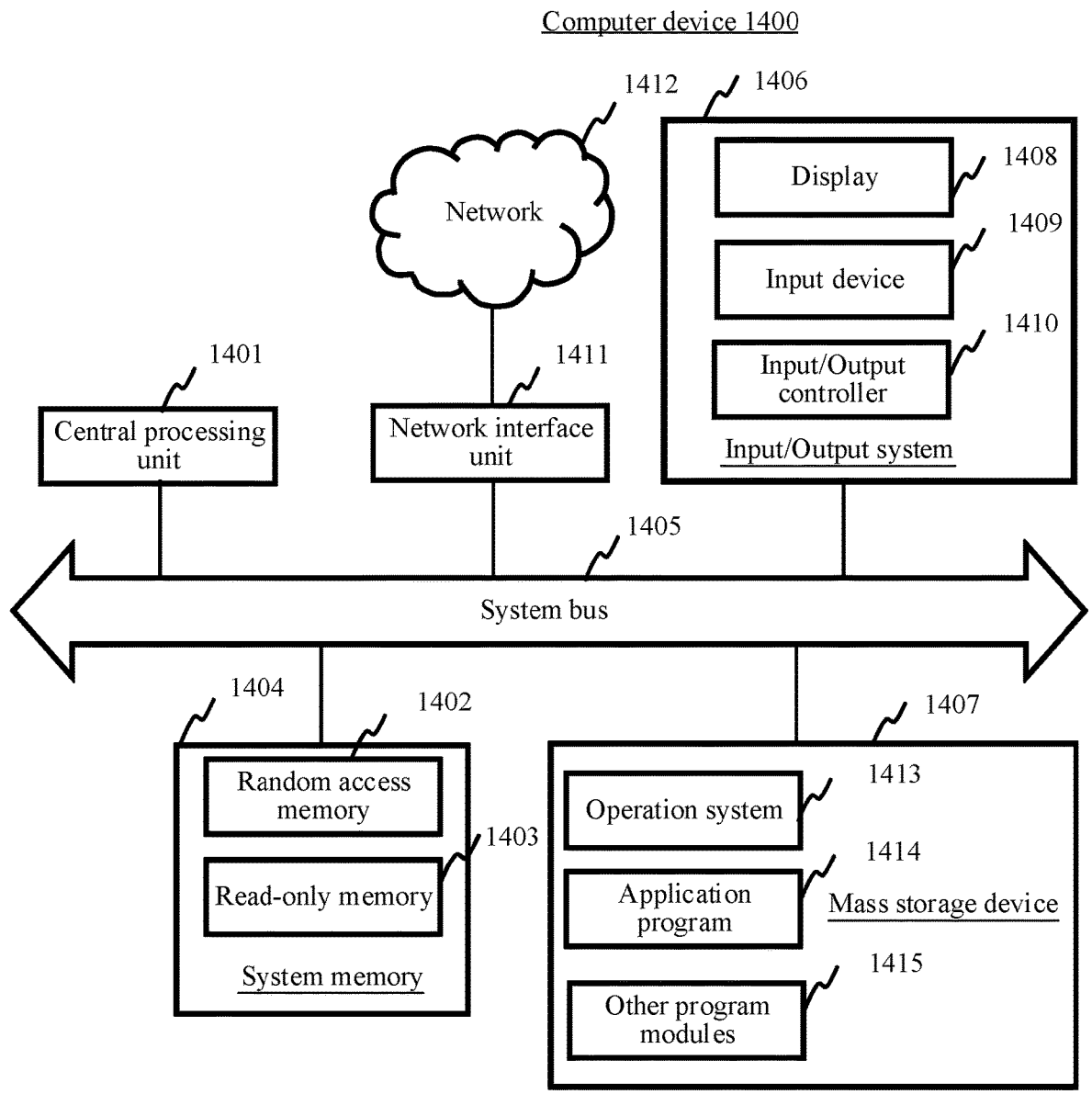
FIG. 14 is a schematic structural diagram of a computer device provided by an embodiment of this disclosure.

FIG. 14 is a schematic structural diagram of a computer device provided by an embodiment of this disclosure. The computer device 1400 includes a Central Processing Unit (CPU) 1401, a system memory 1404 including a Random Access Memory (RAM) 1402 and a Read-Only Memory (ROM) 1403, and a system bus 1405 connecting the system memory 1404 to the CPU 1401. The computer device 1400 further includes a basic input/output (I/O) system 1406 assisting in transmitting information between devices in a computer, and a mass storage device 1407 configured to store an operating system 1413, an application program 1414, and other program modules 1415.

The basic I/O system 1406 includes a display 1408 configured to display information and an input device 1409 such as a mouse or a keyboard that is configured to input information by a user. Both the display 1408 and the input device 1409 are connected to the CPU 1401 through an input/output controller 1410 connected to the system bus 1405. The basic I/O system 1406 may further include the input/output controller 1410, configured to receive and process inputs from a plurality of other devices such as a keyboard, a mouse, and an electronic stylus. Similarly, the input/output controller 1410 further provides an output to a display screen, a printer, or another type of output device.

The mass storage device 1407 is connected to the CPU 1401 by using a mass storage controller (not shown) connected to the system bus 1405. The mass storage device 1407 and a computer-readable medium associated therewith provide non-volatile storage for the computer device 1400. That is, the mass storage device 1407 may include a computer-readable medium (not shown) such as a hard disk or a Compact Disc Read-Only Memory (CD-ROM) drive.

Without loss of generality, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an Erasable Programmable Read-Only Memory (EPROM), an Electrically Erasable Programmable Read-Only Memory (EEPROM), a flash memory or another solid-state memory technology, a CD-ROM, a Digital Video Disc (DVD) or another optical memory, a tape cartridge, a magnetic cassette, a magnetic disk memory, or another magnetic storage device. Certainly, a person skilled in the art may learn that the computer storage medium is not limited to the foregoing several types. The system memory 1404 and the mass storage device 1407 may be collectively referred to as a memory.

According to the embodiments of this disclosure, the computer device 1400 may further be connected, through a network such as the Internet, to a remote computer on the network and run. That is, the computer device 1400 may be connected to a network 1412 through a network interface unit 1411 connected to the system bus 1405, or may be connected to another type of network or a remote computer system (not shown) by using a network interface unit 1411.

The memory also includes one or more programs, and the one or more programs are stored in the memory and configured to be executed by one or more CPUs 1401.

This disclosure also provides a computer-readable storage medium in which at least one instruction, at least one program, code set or instruction set is stored. The at least one instruction, the at least one program, the code set or the instruction set is loaded and executed by a processor to implement the video generation method provided by any of the exemplary embodiments above.

The embodiments of this disclosure provide a computer program product, the computer program product including a computer instruction, and the computer instruction being stored in a computer-readable storage medium (e.g., non-transitory computer-readable storage medium). A processor of a computer device reads the computer instruction from the computer-readable storage medium, and the processor executes the computer instruction, causing the computer device to execute the video generation provided in some foregoing implementations.

A person skilled in the art may understand that all or some of the steps of the above embodiments may be implemented by hardware, or may be implemented by a program instructing relevant hardware, the program may be stored in a computer-readable storage medium, and the storage medium may be a read-only memory, a magnetic disk, an optical disc, or the like.

The foregoing descriptions are some embodiments of this disclosure, and are not intended to limit this disclosure. Any modification, equivalent replacement, improvement and the like made within the spirit and principle of this disclosure shall fall within the protection scope of this disclosure.

What is claimed is:

1. A method for video generation, comprising:
in response to receiving a first audio through an audio input operation in an audio input interface provided by a terminal device, obtaining at least one recommended keyword based on speech recognition of the first audio and displaying the at least one recommended keyword in a keyword selection interface of the terminal device;
generating, in response to an editing operation on the at least one recommended keyword in the keyword selection interface, at least one target keyword based on the at least one recommended keyword edited in the keyword selection interface; and
displaying, in response to a video synthesis operation in the keyword selection interface, a synthesized video in a video display interface of the terminal device, the synthesized video being obtained by splicing plural video clips, each of the plural video clips being determined based on the at least one target keyword such that video tags of the plural video clips match the at least one target keyword based on the at least one recommended keyword edited in the keyword selection interface, and a splicing order of the plural video clips being based on the first audio.

2. The method according to claim 1, wherein the generating the at least one target keyword comprises at least one of:
adding, in response to a first trigger operation on an addition control in the keyword selection interface, a new recommended keyword in the keyword selection interface;
deleting, in response to a second trigger operation on a deletion control in the keyword selection interface, an existing recommended keyword of the at least one recommended keyword from the keyword selection interface; or
displaying, in response to a modification operation on the at least one recommended keyword in the keyword selection interface, a modified recommended keyword in the keyword selection interface.

3. The method according to claim 1, wherein the generating the at least one target keyword comprises:
obtaining, in response to a trigger operation on a deletion control in the keyword selection interface, a keyword quantity of remaining recommended keywords in the keyword selection interface;
deleting an existing recommended keyword corresponding to the deletion control when the keyword quantity is higher than a quantity threshold; and
displaying first prompt information when the keyword quantity is lower than the quantity threshold, the first prompt information indicating the keyword quantity of the remaining recommended keywords.

4. The method according to claim 1, wherein the generating the at least one target keyword comprises:
obtaining, in response to a trigger operation on an addition control in the keyword selection interface, a newly added keyword;
determining degrees of association respectively between the newly added keyword and each of the at least one recommended keyword;
adding the newly added keyword as a new recommended keyword in the keyword selection interface when at least one of the degrees of association is greater than a degree of association threshold; and
displaying second prompt information when each of the degrees of association is less than the degree of association threshold, the second prompt information indicating a degree of association information.

5. The method according to claim 1, wherein the video display interface comprises a resynthesis control, and the method comprises:
displaying, in response to a trigger operation on the resynthesis control in the video display interface, the keyword selection interface.

6. The method according to claim 1, further comprising at least one of:
collecting, in response to a trigger operation on an audio recording control in the audio input interface, the first audio through a microphone of the terminal device; or
obtaining, in response to a trigger operation on an audio upload control in the audio input interface, an audio file corresponding to the first audio.

7. The method according to claim 1, further comprising:
playing, in response to a playback operation on the synthesized video in the video display interface, the synthesized video, the synthesized video comprising subtitles, and the subtitles comprising the at least one target keyword.

8. The method according to claim 1, further comprising:
transmitting, in response to the audio input operation in the audio input interface, the first audio from the terminal device to a server device, the server device being configured to perform the speech recognition on the first audio and determine the at least one recommended keyword; and
displaying, by the terminal device, the keyword selection interface based on the at least one recommended keyword that is received by the terminal device from the server device.

9. The method according to claim 1, further comprising:
transmitting, in response to a trigger operation on a video synthesis control in the keyword selection interface, the at least one target keyword to a server device, the server device being configured to perform video clip matching based on the at least one target keyword to obtain the plural video clips, and generate the synthesized video based on the plural video clips; and
displaying, by the terminal device, the video display interface based on the synthesized video that is received by the terminal device from the server device.

10. A method for video generation, comprising:
performing, by a server device, a speech recognition on a first audio to determine at least one recommended keyword in response to a receipt of the first audio;
performing, in response to a video synthesis request, a video clip matching based on at least one target keyword to obtain plural video clips such that video tags of the plural video clips match the at least one target keyword, the at least one target keyword being determined by a terminal device based on the at least one recommended keyword edited in a keyword selection interface of the terminal device; and generating a synthesized video by splicing the plural video clips, wherein a splicing order of the plural video clips is based on the first audio.

11. The method according to claim 10, further comprising:

performing the speech recognition on the first audio to obtain a first text content;

performing a keyword extraction on the first text content to determine the at least one recommended keyword;

generating a second text content based on the at least one target keyword and the first text content; and splicing the plural video clips to generate the synthesized video.

12. The method according to claim 11, wherein the generating the second text content comprises:

generating the second text content based on the first text content when the at least one target keyword belongs to the first text content.

13. The method according to claim 11, wherein the generating the second text content comprises:

generating a description text corresponding to a first target keyword in the at least one target keyword when the first target keyword does not belong to the first text content; and generating the second text content based on the first text content and the description text.

14. The method according to claim 13, wherein the generating the description text corresponding to the first target keyword comprises:

obtaining a first video clip corresponding to the first target keyword; and determining the description text corresponding to the first target keyword based on the first video clip.

15. The method according to claim 11, further comprising:

performing speech synthesis based on the second text content and an acoustic characteristic of the first audio to obtain a second audio, the second audio using the second text content and having the acoustic characteristic of the first audio; and generating the synthesized video based on the plural video clips and the second audio.

16. The method according to claim 10, wherein the performing the video clip matching comprises:

obtaining the at least one target keyword based on the video synthesis request received by the server device from the terminal device, the video synthesis request being transmitted by the terminal device in response to a video synthesis operation in a keyword selection interface of the terminal device; and performing the video clip matching based on the at least one target keyword and video tags for video clips to obtain the plural video clips.

17. The method according to claim 16, further comprising:

transmitting the synthesized video to the terminal device, the terminal device being configured to display the synthesized video in a video display interface.

18. An apparatus for video generation, comprising:

processing circuitry configured to:

in response to receiving a first audio through an audio input operation in an audio input interface, obtain at least one recommended keyword based on speech recognition of the first audio and display the at least one recommended keyword in a keyword selection interface;

generate, in response to an editing operation on the at least one recommended keyword in the keyword selection interface, at least one target keyword based on the at least one recommended keyword edited in the keyword selection interface; and display, in response to a video synthesis operation in the keyword selection interface, a synthesized video in a video display interface, the synthesized video being obtained by splicing plural video clips, each of the plural video clips being determined based on the at least one target keyword such that video tags of the plural video clips match the at least one target keyword based on the at least one recommended keyword edited in the keyword selection interface, and a splicing order of the plural video clips being based on the first audio.

19. The apparatus according to claim 18, wherein the processing circuitry is configured to perform at least one of:

adding, in response to a trigger operation on an addition control in the keyword selection interface, a new recommended keyword in the keyword selection interface;

deleting, in response to a trigger operation on a deletion control in the keyword selection interface, an existing recommended keyword of the at least one recommended keyword from the keyword selection interface; or displaying, in response to a modification operation on the at least one recommended keyword in the keyword selection interface, a modified recommended keyword in the keyword selection interface.

20. The apparatus according to claim 18, wherein the processing circuitry is configured to:

obtain, in response to a trigger operation on a deletion control in the keyword selection interface, a keyword quantity of remaining recommended keywords in the keyword selection interface;

delete an existing recommended keyword corresponding to the deletion control when the keyword quantity is higher than a quantity threshold; and display first prompt information when the keyword quantity is lower than the quantity threshold, the first prompt information indicating the keyword quantity of the remaining recommended keywords.

* * * * *